US010923139B2

(12) United States Patent
Shen et al.

(10) Patent No.: US 10,923,139 B2
(45) Date of Patent: Feb. 16, 2021

(54) SYSTEMS AND METHODS FOR PROCESSING MEETING INFORMATION OBTAINED FROM MULTIPLE SOURCES

(71) Applicant: Melo Inc., San Jose, CA (US)

(72) Inventors: Guobin Shen, Beijing (CN); Zheng Han, Beijing (CN)

(73) Assignee: MELO INC., San Jose, CA (US)

( * ) Notice: Subject to any disclaimer, the term of this patent is extended or adjusted under 35 U.S.C. 154(b) by 100 days.

(21) Appl. No.: 16/102,690

(22) Filed: Aug. 13, 2018

(65) Prior Publication Data

US 2019/0341068 A1 Nov. 7, 2019

Related U.S. Application Data

(60) Provisional application No. 62/665,502, filed on May 2, 2018.

(51) Int. Cl.
*G10L 25/60* (2013.01)
*G10L 25/21* (2013.01)
(Continued)

(52) U.S. Cl.
CPC .............. *G10L 25/60* (2013.01); *G10L 17/00* (2013.01); *G10L 25/21* (2013.01); *G10L 25/84* (2013.01);
(Continued)

(58) Field of Classification Search
CPC ......... G10L 25/48; G10L 25/51; G10L 25/57; G10L 25/84; G10L 17/00; G10L 17/005; H04L 12/1831
See application file for complete search history.

(56) References Cited

U.S. PATENT DOCUMENTS 9,319,782 B1 * 4/2016 Crump ................... H04R 3/02
2002/0188453 A1 * 12/2002 Hirschberg ........... H04M 3/533
704/270
(Continued)

OTHER PUBLICATIONS

Fügen, Christian, et al. "The ISL RT-06S speech-to-text system." International Workshop on Machine Learning for Multimodal Interaction. Springer, Berlin, Heidelberg, 2006. (Year: 2006).*

(Continued)

*Primary Examiner* — Paras D Shah
(74) *Attorney, Agent, or Firm* — Bayes PLLC

(57) ABSTRACT

Systems and methods are provided for processing information of a meeting. An exemplary system may include a communication interface configured to receive meeting information obtained by a plurality of client devices. The meeting information may include multiple audio streams. The system may also include a memory and a processor. The processor may execute instructions stored on the memory to perform operations. The operations may include determining signal-to-noise-ratio (SNR) indicators associated with the audio streams. The operations may also include selecting, from the audio streams, a candidate audio stream based on the SNR indicators. The SNR indicator associated with the candidate audio stream may indicate that the candidate audio stream has a higher average SNR than that of a predetermined number of other audio streams. In addition, the operations may include generating an output data stream including at least a portion of the candidate audio stream.

18 Claims, 8 Drawing Sheets

(51) Int. Cl.
  *G10L 25/84*  (2013.01)
  *G10L 17/00*  (2013.01)
  *G06K 9/00*  (2006.01)
  *H04L 12/18*  (2006.01)

(52) U.S. Cl.
  CPC ...... *G06K 9/00228* (2013.01); *H04L 12/1831* (2013.01)

(56) References Cited

U.S. PATENT DOCUMENTS

| | | | |
|---|---|---|---|
| 2011/0093273 A1* | 4/2011 | Lee | G10L 15/24 704/270 |
| 2011/0307253 A1 | 12/2011 | Lloyd et al. | |
| 2012/0117180 A1* | 5/2012 | Ranasinghe | H04J 3/0667 709/208 |
| 2013/0151242 A1 | 6/2013 | Kim | |
| 2013/0162752 A1* | 6/2013 | Herz | H04N 7/15 348/14.08 |
| 2013/0300648 A1 | 11/2013 | Kim et al. | |
| 2014/0359139 A1* | 12/2014 | Efrati | H04L 65/403 709/227 |
| 2015/0088515 A1* | 3/2015 | Beaumont | G10L 17/06 704/251 |
| 2016/0232920 A1* | 8/2016 | Matheja | H04R 3/005 |
| 2017/0041358 A1* | 2/2017 | Wang | H04L 65/403 |
| 2017/0069307 A1* | 3/2017 | Min | G06K 9/6292 |
| 2018/0349086 A1* | 12/2018 | Chakra | H04W 64/00 |

OTHER PUBLICATIONS

International Search Report and Written Opinion issued in related International Application No. PCT/US2019/029232, dated Aug. 5, 2019, 7 pages.

* cited by examiner

SYSTEMS AND METHODS FOR PROCESSING MEETING INFORMATION OBTAINED FROM MULTIPLE SOURCES

CROSS REFERENCE TO RELATED APPLICATION

The present application is based on and claims the benefits of priority to U.S. Provisional Application No. 62/665,502, filed May 2, 2018, which is incorporated herein by reference in its entirety.

TECHNICAL FIELD

The present disclosure relates to systems and methods for processing meeting information (e.g., audio and video data) obtained from multiple sources (e.g., recording devices). More particularly, the present disclosure relates to systems and methods for automatically identifying high-quality audio data from multiple audio streams, combining the high-quality audio data with matching video data, and integrating the video/audio data with other contextual meeting information to create annotated meeting logs.

BACKGROUND

Meetings can be held between multiple individuals or groups for a variety of personal, business, and entertainment-related reasons. In many cases, meeting attendees (also referred to as meeting participants) may wish to record a meeting for a variety of purposes, such as archiving certain business practices, providing a more vivid form of memo for future review, aiding notes taking, etc. However, in some meetings, dedicated meeting recording facilities may not be readily available. As an alternative, meeting attendees may record a meeting on an ad-hoc basis using one or more portable computing devices, such as laptops, mobile phones, tablets, etc. As many of such devices are capable of making audio and/or video recordings, it is natural and convenience that meeting attendees use these devices to record a meeting.

There are, however, certain limitations for making meeting recordings using portable computing devices. First, a portable computing device usually cannot capture a meeting with satisfactory coverage and clarity. Instead, such a device usually only partially captures the meeting with limited recording quality. For example, a camera device equipped on a typical portable computing device normally has a rather limited field of view and can only capture a limited range. In another example, a microphone device of a typical portable computing device is usually designed to record sound in near field. Thus, the performance of the microphone device normally degrades as the distance between a speaker (i.e., an attendee that speaks in the meeting) and the microphone device increases. In practice, in meetings with multiple attendees, the distances between speakers and the microphone device may vary, and it is common that the distance between the microphone device and a speaker exceeds the near field limit and very poor recording quality would result. Because the quality of captured or recorded video/audio signals may significantly affect, if not dictate, the effectiveness of subsequent processing (e.g., automatic speech recognition to transcribe sound signals to text for automatic notes taking), it is important to obtain high quality recording signals at the outset (e.g., before subsequent processing).

In addition, ad-hoc video/audio recordings captured by portable computing devices normally lack sophisticated tagging information (e.g., tags, annotations, or other meta data associated with the recordings). Therefore, the ability to automatically tag meeting recordings is desirable to provide contextual information for subsequent consumption of the logged meeting contents. For instance, meeting diarization, a process of automatically splitting an audio recording into speaker segments and determining which segments are uttered by which speaker, would make reviewing meeting logs more convenient and user-friendly. In another example, synchronizing the video of a speaker with the accompanying audio of the same speaker would help a watcher of the meeting logs to grasp the pace of the meeting.

Moreover, ad-hoc video/audio recordings captured by portable computing devices often lack a coherent integration with other information related to the meeting, such as per-meeting preparation materials, in-meeting notes, and post-meeting follow-ups. A typical practice is to communicate such information through emails and manually associate such information with recorded video/audio files, which is cumbersome and time-consuming.

Embodiments of the disclosure address the above problems by systems and methods for automatically identifying high-quality audio data from multiple audio streams, combining the high-quality audio data with matching video data, and integrating the video/audio data with other contextual meeting information to create annotated meeting logs.

SUMMARY

In one aspect, the present disclosure relates to a system for processing information of a meeting. The system may include a communication interface configured to receive meeting information obtained by a plurality of client devices. The meeting information may include multiple audio streams. The system may also include a memory storing computer-executable instructions. The system may also include a processor in communication with the communication interface and the memory. The processor may be configured to execute the computer-executable instructions to perform operations. The operations may include determining signal-to-noise-ratio (SNR) indicators associated with the audio streams. The operations may also include selecting, from the audio streams, a candidate audio stream based on the SNR indicators, wherein the SNR indicator associated with the candidate audio stream indicates that the candidate audio stream has a higher average SNR than that of a predetermined number of other audio streams. In addition, the operations may also include generating an output data stream including at least a portion of the candidate audio stream.

In another aspect, the present disclosure relates to a method for processing information of a meeting. The method may include receiving, by a communication interface, meeting information obtained by a plurality of client devices. The meeting information may include multiple audio streams. The method may also include determining signal-to-noise-ratio (SNR) indicators associated with the audio streams. The method may also include selecting, from the audio streams, a candidate audio stream based on the SNR indicators. The SNR indicator associated with the candidate audio stream may indicate that the candidate audio stream has a higher average SNR than that of a predetermined number of other audio streams. In addition, the method may include generating an output data stream including at least a portion of the candidate audio stream.

In a further aspect, the present disclosure relates to a non-transitory computer-readable medium storing instructions that are executable by at least one processor to cause performance of a method for processing information of a meeting. The method may include receiving, by a communication interface, meeting information obtained by a plurality of client devices. The meeting information may include multiple audio streams. The method may also include determining signal-to-noise-ratio (SNR) indicators associated with the audio streams. The method may also include selecting, from the audio streams, a candidate audio stream based on the SNR indicators. The SNR indicator associated with the candidate audio stream may indicate that the candidate audio stream has a higher average SNR than that of a predetermined number of other audio streams. In addition, the method may include generating an output data stream including at least a portion of the candidate audio stream.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods to process meeting information obtained from multiple sources and integrate the meeting information to generate organized and annotated meeting logs. Meeting information may include media information such as audio and video recording of a meeting (including media file data and streaming data), as well as meeting interaction information such as notes, files, documents, images, and audio/video data that are exchanged among meeting attendees prior to, during, and after a meeting.

Exemplary systems may be provided in a centralized or distributed manner, and may utilize hardware, software, or a combination thereof to aggregate contextual meeting contents (e.g., audio, video, notes, presentations, etc.) obtained or captured from multiple sources (e.g., portable computing devices, also referred to as client devices) into a coherent package such that matching or related meeting information (e.g., synchronized video and audio of the same speaker, synchronized notes and audio/video data, etc.) are interlinked with each other. Some embodiments may use a Signal-to-Noise Ratio (SNR)-based audio stream selection algorithm to generate a high-quality audio record of a meeting. Some embodiments may implement an effective active speaker (e.g., a speaking meeting attendee) detection algorithm based on captured video signals and use voice-printing techniques to diarize attendees' speeches. Some embodiments may utilize an audio/video fusion algorithm to combine matching audio and video signals of the same speaker to compose an output audio/video stream. Some embodiments may link such information as meeting attendees' manual notes and automatically detected meta data to the recorded audio/video content and/or a transcription of the recording generated by automatic speech recognition. In addition, some embodiments may provide a reverse editing feature to support editing of audio/video meeting records.

Figure 1:
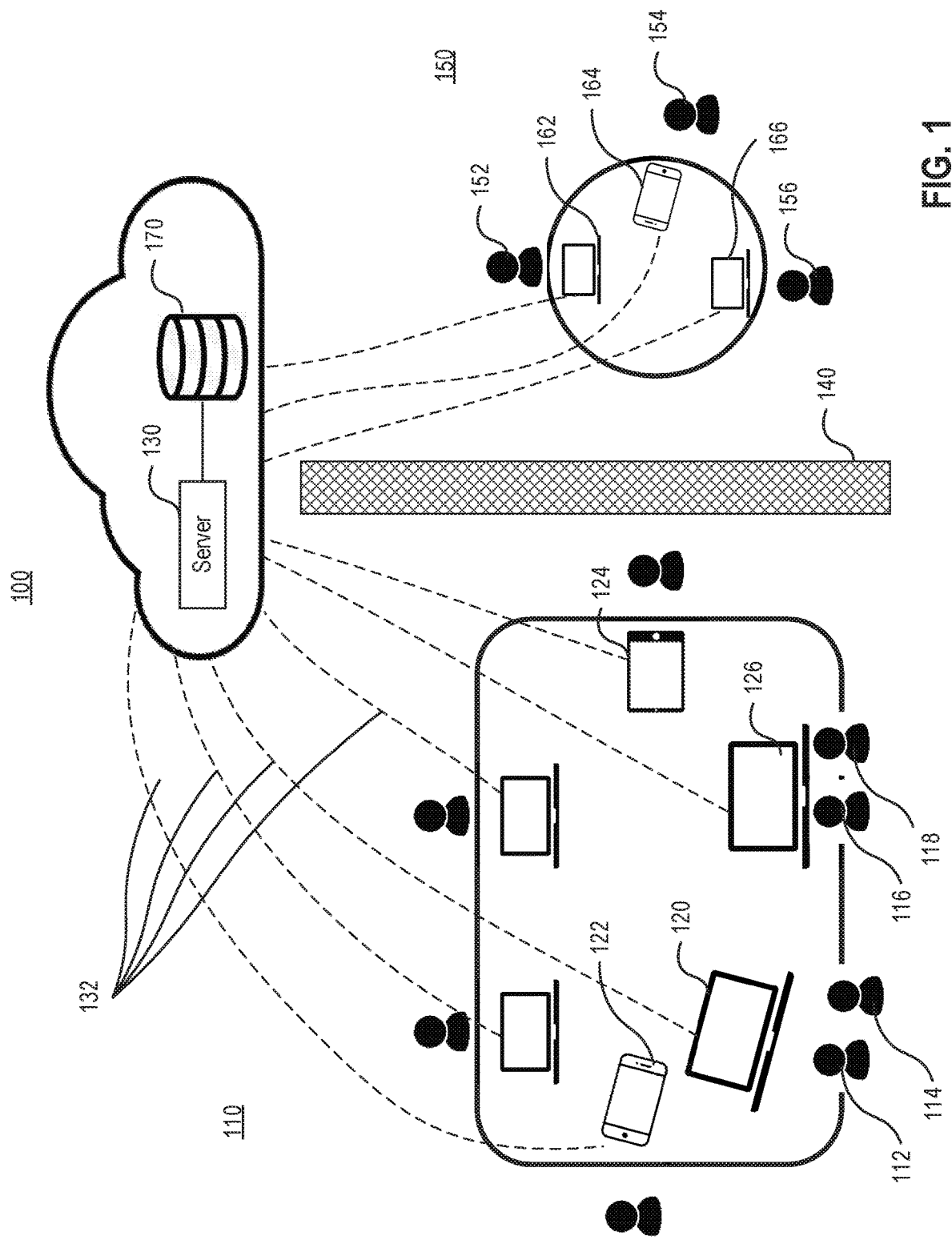
FIG. 1 illustrates a schematic diagram of an exemplary system for processing meeting information, according to embodiments of the disclosure.

FIG. 1 illustrates an exemplary system 100 configured to process meeting information, in which various implementations described herein may be practiced. System 100 may be used, for example, in association with a meeting environment in which local attendees (e.g., a group of attendees including 112, 114, 116, and 118 present within a conference room 110) and/or remote attendees (e.g., attendees 152, 154, and 156 attending in a remote location 150 that is separate from conference room 110 by at least a barrier 140) meet together in-person (e.g., for local attendees) and/or via telecommunication (e.g., between local and remote attendees) to discuss topics of mutual interest. System 100 may include client devices capable of real-time audio and/or video recording and sharing. The client devices may include one or more computers (e.g., laptops 120, 126, 162, 166, etc.), one or more mobile phones (e.g., smart phones 122, 164), and one or more tablets/pads (e.g., tablet 124). The client devices may be equipped with displays, keyboards, touchscreens, microphones, speakerphones, mice, touchpads, trackballs, or other I/O devices. System 100 may also include a server 130 that communicates with client devices by way of communication links 132 (shown as dotted-lines in FIG. 1, only four of them being annotated as reference number 132 for conciseness). Communication links 132 may include any wired and wireless communication channels allowing information exchange between server 130 and individual client devices.

Server 130 may include or access at least one database 170 storing, among other things, meeting logs (e.g., audio data, video data, pictures, documents, tags, meta data, etc.). Database 170 may include a volatile or non-volatile, magnetic, semiconductor, tape, optical, removable, non-removable, or other type of storage device or tangible computer-readable medium. In some embodiments, database 170 may be a local database or a cloud database. Database 170 may store information relating to particular users (e.g., attendees and/or non-attending users) of system 100 and/or information relating to data streams captured during previously conducted and/or ongoing meetings. The information stored within database 130 may come from any source and be provided at any time and frequency. For example, the information could be continuously streamed from system components (e.g., from one or more client devices) during a meeting, downloaded from system components at conclusion of a meeting, manually entered (e.g., via one or more client devices) based on live observations during and/or after a meeting, automatically retrieved from an external server, intermittently pulled from "the cloud," or obtained in any other manner at any other time and frequency. In addition to the user and/or meeting information, database 170 may also include tools for analyzing the information stored therein. Server 130 may access database 170 to determine relationships and/or trends relating to particular users of system 100 and/or meetings, and other such pieces of information. Server 130 may pull information from database 170, manipulate the information, and analyze the information. Server 130 may also update the information, store new information, and store analysis results within database 170, as desired.

In some embodiments, database 170 may include one or more data storage devices that store information associated with meeting attendees and/or other users of system 100. The attendee and/or user information may include identification information (e.g., ID names and/or numbers), contact information (e.g., phone numbers and/or email addresses), calendar information (e.g., meeting schedules or meeting invitations), and biometric characteristics (e.g., body characteristics, facial characteristics, voice characteristics, retinal characteristics, fingerprint characteristics, etc.) that are unique to the attendee or user. Consistent with the present disclosure, server 130 may retrieve the attendee and/or user information from database 170, and use the information to aid in performance of the disclosed methods. For example, the information may be used to identify a meeting attendee and/or authorized user, to tag stored data streams inside meeting logs with attendee identification information, and to selectively allow access to the meeting logs based on the identification.

In some embodiments, database 170 may include one or more data storage devices that store information captured in association with particular meetings. The meeting information may include any number of different data streams, for example a display position stream (DPS) including video displayed on any client device or a shared display device used during the meeting, one or more attendee position streams (APS) including video of attendees of the meeting, one or more video streams (VS) including video of the meeting and/or attendees, one or more audio streams (AS) including audio of the attendees, one or more caption streams (CS) associated with the voice/audio stream(s), an index of key words used during the meeting, a list of topics discussed during the meeting, and/or an amendment stream (AMS) associated with comments and/or reactions made after the meeting during review of the meeting by an authorized user. In some embodiments, some or all of these data streams may be compressed and stored together within database 170 as a single data file (e.g., a .mas file) associated with each particular meeting. In some embodiments, some or all of these data streams may be stored as separate data files within database 170. One or more client devices may access (e.g., via communication links 132) server 130 and/or database 170 to retrieve the stored information.

System 100 can be flexibly configured to accommodate various meeting scenarios. For example, system 100 may be configured to allow any number of client devices to be used in a meeting. In other words, it is not necessary that every meeting attendee brings a client device of his/her own. Multiple attendees may share a client device (e.g., attendees 112 and 114 may share client device 120, and attendees 116 and 118 may share device 126, as shown in FIG. 1). An attendee may also bring multiple client devices to record the meeting. In another example, system 100 may be configured to allow a subset of the client device to record the meeting. In other words, it is not necessary that a speaker's voice and/or image be captured by all microphones and/or cameras on all client devices. System 100 may also be configured to receive and process meeting information of differing types, quality, shooting angles, field of views, or other characteristics. In practice, the capability (e.g., microphone sensitivity, camera field of view coverage and resolution, processing power, etc.) of client devices can be different. For example, some devices may only capture audio, others may capture video or both. Thus, out of N client devices, Na (Na<=N) audio streams and Nv (Nv<=N) video streams may be generated. Client devices can be arbitrarily placed. It is possible that some attendees or speakers are captured by multiple cameras whereas some may not be captured by any camera. In addition, an attendee or speaker may be captured by a camera from time to time. In any case, system 100 may be configured to accommodate various meeting scenarios and utilize the audio and/or video data captured by multiple client devices to identify and select high quality recordings.

In some embodiments, when multiple client devices are used to record a meeting, each client device may be capable of recording audio and/or video for at least part of the whole meeting. System 100 may receive and process the audio/video data captured by the multiple client devices to generate a comprehensive meeting record. For a source signal (e.g., an attendee's face, body, or voice) that is captured by multiple devices, the quality of the recording can be enhanced through synthesizing multiple observations. Instead of relying on any single recording device, system 100 may effectively utilize a distributed microphone array formed by the microphones of multiple client devices and/or a distributed camera array formed by the cameras of multiple client devices. Advanced signal processing such as distributed beamforming (e.g., for audio) and/or super-resolution or panorama (e.g., for video) can be applied to enhance the quality of the recording. In the following description, exemplary hardware and software implementations of various components of system 100 are discussed. In particular, an SNR-based audio stream selection algorithm used to compose an output audio stream by selecting high quality audio segments from multiple audio streams captured by multiple client devices is disclosed.

Figure 2:
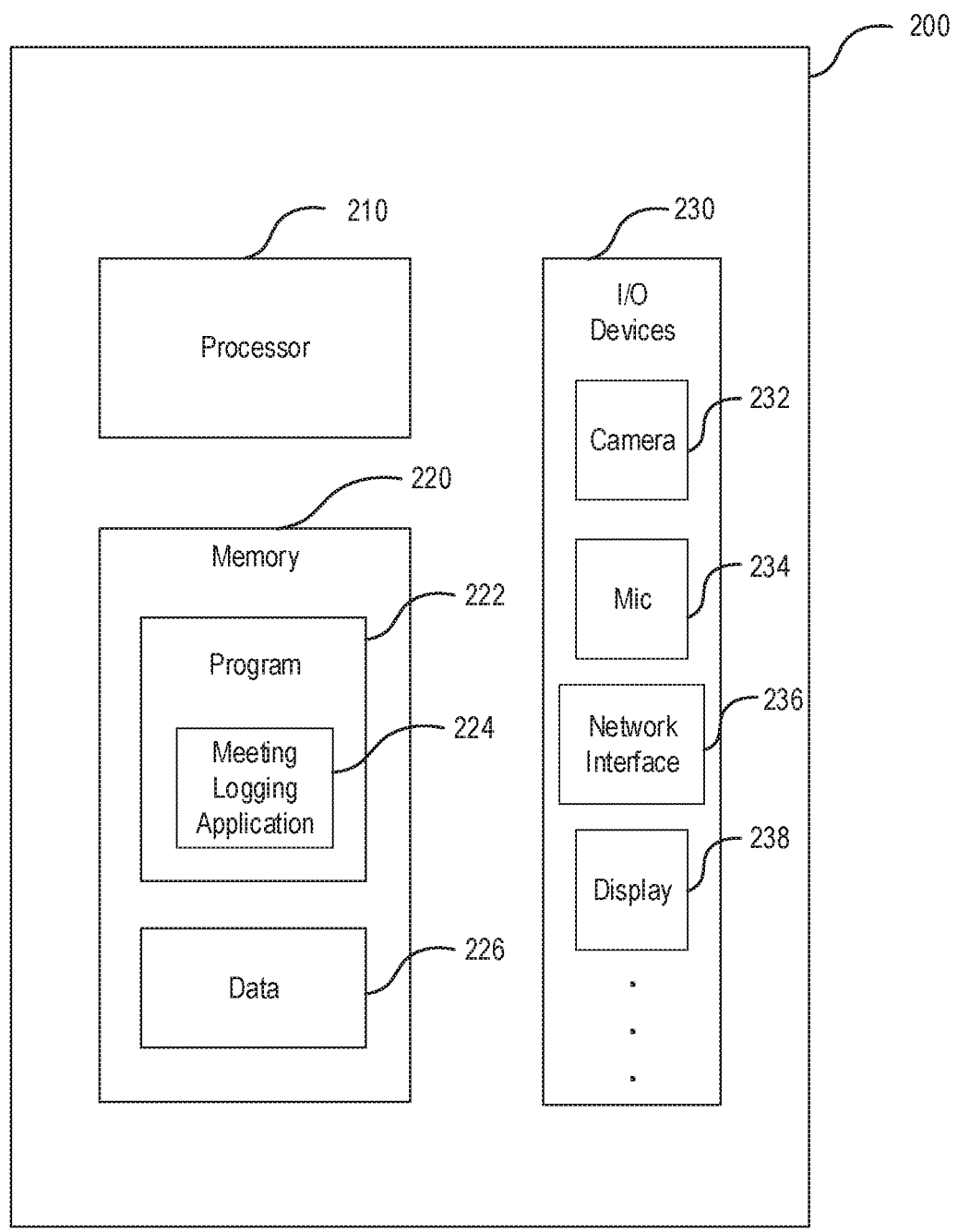
FIG. 2 is a block diagram of an exemplary client device that may be used in the system of FIG. 1.

FIG. 2 is a block diagram of an exemplary client device 200. Client device 200 may include one or more electronic devices having data capturing, data transmitting, data processing, and/or data displaying capabilities. In some embodiments, client device 200 may include a mobile computing device, such as a smart phone (e.g., 122, 164 shown in FIG. 1), a tablet (e.g., 124 shown in FIG. 1), or a laptop computer (e.g., 120, 126, 162, 166 shown in FIG. 1). In other embodiments, client device 200 may include a stationary device such as a desktop computer or a conferencing console (e.g., a console located within conference room 110 or remote location 150—not shown).

As shown in FIG. 2, client device 200 may include at least one processor 210, memory 220, and input/output devices (I/O devices) 230. Processor 210 may include any microprocessors or mobile computing units suitable for execute computer instructions and perform operations according to the instructions. For example, processor 210 may include a central processing unit (CPU), a graphical processing unit (GPU), a mobile processor, an embedded processor, a system-on-chip (SoC), etc.

I/O devices 230 may include devices that facilitate the capturing, sending, receiving and consuming of meeting information. I/O devices 230 may include, for example, a camera 232, a microphone 234, a display 238, a keyboard, buttons, switches, a touchscreen panel, and/or a speaker (only camera 232, microphone 234, and display 238 are shown in FIG. 2 for conciseness). I/O devices 230 may also include one or more communication interfaces, such as network interface 236, for sending information to and receiving information from other components of system 100 via communication links 132. In some embodiments, network interface 236 may include an integrated services digital network (ISDN) card, a cable modem, a satellite modem, or another type of modem used to provide a data communication connection. As another example, network interface 236 may include a local area network (LAN) card to provide a data communication connection to a compatible LAN. Wireless links can also be implemented by client device 200 via I/O devices 230. In such an implementation, client device 200 can send and receive (e.g., via communication links 132) electrical, electromagnetic, and/or optical signals that carry digital data streams representing various types of information.

Camera device 232 may be a standalone device communicatively coupled (e.g., via wires or wirelessly) to client device 200, or a device that is integral with (e.g., embedded within) client device 200. Camera device 232 may include, among other things, one or more processors, one or more sensors, a memory, and a transceiver. It is contemplated that camera device 232 can include additional or fewer components. Each sensor may be, for example, a semiconductor charge-coupled device (CCD), a complementary metal-oxide-semiconductor (CMOS) device, or another device capable of capturing optical images and converting the images to digital still image and/or video data.

Camera device 232 may be configured to generate one or more video streams related to the meeting. For example, camera device 232 can be configured to capture images of the meeting attendees, as well as their actions and reactions during the meeting. Camera device 232 may also be configured to capture content presented or otherwise displayed during the meeting, such as writing and drawings on a whiteboard or paper flipper, content displayed on an electronic display (e.g., an LCD or LED screen in conference room 110), and content projected onto a display (e.g., onto a projector screen in conference room 110).

In some cases, camera device 232 may include a narrow Field of View (FoV) sensor having limited coverage during video recording. This is common in cases where meeting attendees use their mobile phones or tables to record a meeting. While the video recording generated by a single camera device is often inadequate to provide a panorama view of the meeting with high quality, embodiments disclosed herein can take advantage of multiple video recordings captured by different camera devices to enhance the overall quality of the meeting logs. Details regarding video processing and selecting will be discussed later in this disclosure.

Microphone device 234 may be a standalone device communicatively coupled (e.g., via wires or wirelessly) to client device 200, or an integral device that is embedded within client device 200. In some embodiments, microphone device 234 can include various components, such as one or more processors, one or more sensors, a memory, and a transceiver. It is contemplated that microphone device 234 can include additional or fewer components. The sensor(s) may embody one or more transducers configured to convert acoustic waves that are proximate to microphone device 234 to a stream of digital audio data. In some embodiments, microphone device 234 may transmit a microphone feed to server 130, including audio stream data.

Embodiments of the present disclosure may process multiple audio streams recorded by multiple microphone devices, and essentially treat the multiple microphone devices as an ad-hoc microphone array (also referred to as a mic-array). Comparing to using an individual microphone to record a meeting, the use of a mic-array to capture meeting sound can help record attendees' speeches more clearly, which may improve the accuracy of later automatic speech recognition processes. The mic-array can also help to select, among different audio streams, the best quality audio stream as a candidate for final output.

Camera device 232 and microphone device 234 can be configured to, alone or in combination with processor 210, packetize and transmit video and audio data, respectively, to server 130 and/or database 170 via communication links 132. Data may be transmitted in real-time (e.g., using streaming) or intermittently (e.g., after a set time interval). In some embodiments, communication links 132 may include, alone or in any suitable combination, a telephone-based network (such as a PBX or POTS), a local area network (LAN), a wide area network (WAN), a dedicated intranet, and/or the Internet. Further, architecture of communication links 132 may include any suitable combination of wired and/or wireless components. For example, the architecture may include non-proprietary links and protocols, or proprietary links and protocols based on known industry standards, such as J1939, RS-232, RP122, RS-422, RS-485, MODBUS, CAN, SAEJ1587, Bluetooth, the Internet, an intranet, 802.11 (b, g, n, ac, or ad), or any other communication links and/or protocols known in the art.

Display 238 may include a liquid crystal display (LCD), a light emitting diode (LED) screen, an organic light emitting diode (OLED) screen, a projector screen, a whiteboard, and/or another known display device. Display 238 may be a standalone device communicatively coupled (e.g., via wires or wirelessly) to client device 200, or a device that is integral with (e.g., embedded within) client device 200. Display 238 may be used to display video signals, graphics, text, writing, audio signals, etc. to a local and/or remote meeting attendee.

Memory 220 may include a volatile or non-volatile, magnetic, semiconductor, tape, optical, removable, non-removable, or other type of storage device or tangible and/or non-transitory computer-readable medium that stores one or more executable programs 222, such as a meeting logging application 224. Program 222 may also include an operating system and/or communication software that, when executed by processor 210, provides communications using communication links 132 (referring to FIG. 1), such as Web browser software, tablet or smart handheld device networking software, etc. Memory 220 may also store data 226, including video, audio, image, text, and other types of information pertinent to logging a meeting.

Figure 3:
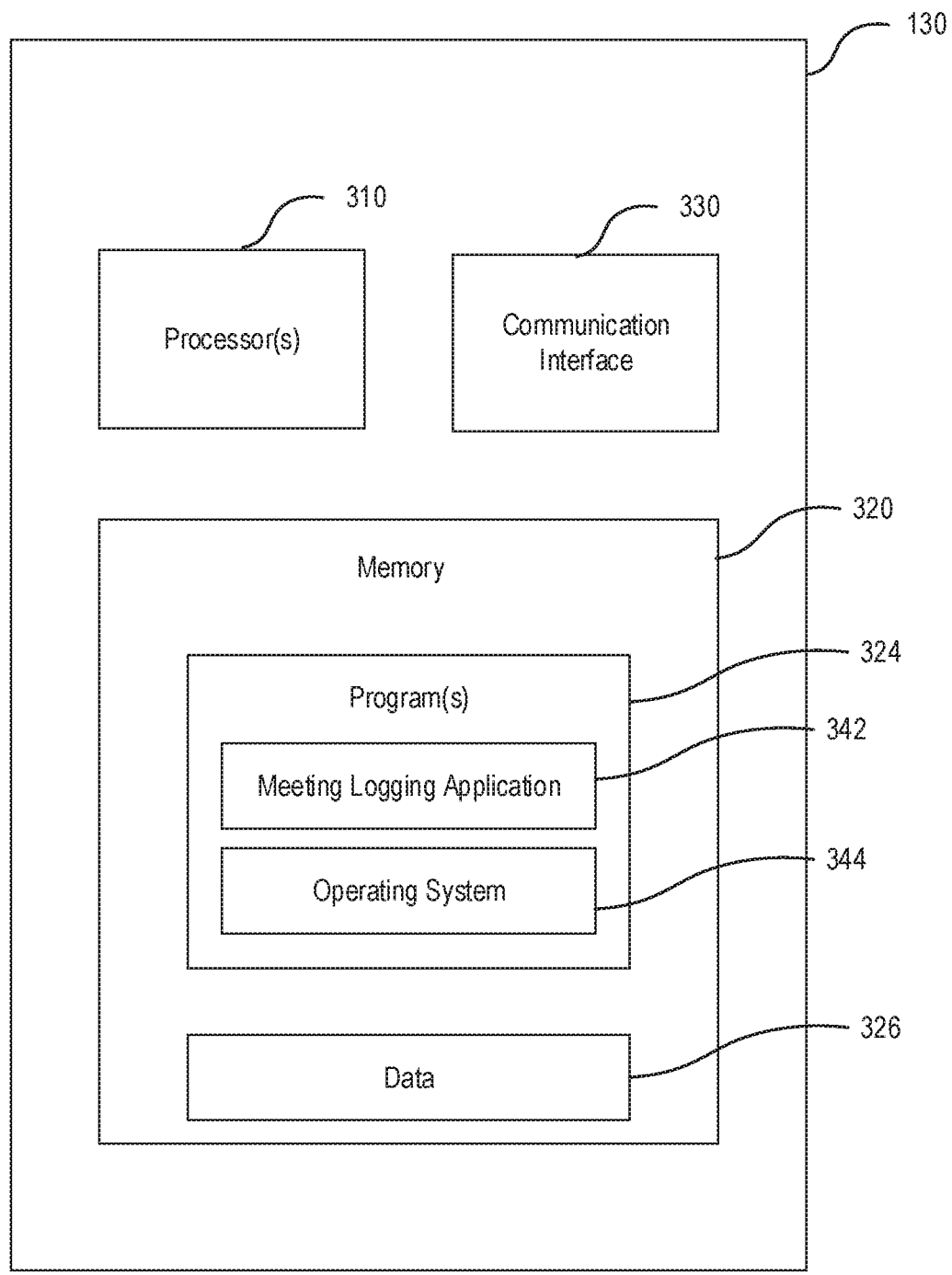
FIG. 3 is a block diagram of an exemplary server that may be used in the system of FIG. 1.

FIG. 3 is a block diagram of an exemplary server 130 that may be used in system 100 shown in FIG. 1. Server 130 can be a local physical server, a cloud server, a virtual server, a distributed server, or any other suitable computing device. Server 130 may be configured to process multiple data streams acquired by client devices during a meeting, and responsively generate a log of the meeting that includes the data streams and/or information derived from the data streams. In some embodiments, server 130 may be further configured to share, distribute, and update the meeting log after the meeting. For example, server 130 may share the meeting log with meeting attendees or other authorized users, allowing the attendees/users to access and provide feedback (e.g., via one or more client devices) associated with the data streams. Server 130 may then update the meeting log to include the attendee/user input.

In some embodiments, server 130 may be configured to receive multiple auxiliary streams and generate meeting logs that preserve details and facilitate matching of meeting content with attendees. Server 130 may also enable, for select attendees/users, multi-faceted reviewing and interaction of meeting notes.

As shown in FIG. 3, server 130 may include a communication interface 330, a processor 310, and a memory 320 having one or more programs 324 and/or data 326 stored thereon. In some embodiments, server 130 may have different modules co-located within a single device, such as within an integrated circuit (IC) chip (e.g., implemented as an application-specific integrated circuit (ASIC) or a field-programmable gate array (FPGA)), or within separate devices having dedicated functions. Some or all of the components of server 130 may be co-located in a cloud, provided in a single location (such as inside a mobile device), or provided in distributed locations.

Communication interface 330 may be configured to send information to and receive information from other components of system 100 via communication links 132. In some embodiments, communication interface 330 can include an integrated services digital network (ISDN) card, cable modem, satellite modem, or a modem to provide a data communication connection. As another example, communication interface 330 can include a local area network (LAN) card to provide a data communication connection to a compatible LAN. Wireless links can also be implemented by communication interface 330. In such an implementation, communication interface 330 can send and receive electrical, electromagnetic or optical signals that carry digital data streams representing various types of information via communication links 132.

Processor 310 can include one or more processing devices configured to perform functions of the disclosed methods. Processor 310 may include any appropriate type of general-purpose or special-purpose microprocessor, digital signal processor, graphic processor, or microcontroller. In some embodiments, processor 310 can constitute a single core or multiple cores executing parallel processes simultaneously. For example, processor 310 can be a single-core processor configured with virtual processing technologies. In certain embodiments, processor 310 uses logical processors to simultaneously execute and control multiple processes. Processor 310 can implement virtual machine technologies, or other known technologies to provide the ability to execute, control, run, manipulate, and store multiple software processes, applications, programs, etc. In another embodiment, processor 310 may include a multiple-core processor arrangement (e.g., dual core, quad core, etc.) configured to provide parallel processing functionalities that allow server 130 to execute multiple processes simultaneously. As discussed in further detail below, processor 310 may be specially configured with one or more applications and/or algorithms for performing method steps and functions of the disclosed embodiments. For example, processor 310 can be configured with hardware and/or software components that enable processor 310 to receive real-time camera feed, receive real-time audio feed, record video, record audio, receive user-provided control instructions regarding video and/or audio playback, and selectively transmit to communication links 132 the real-time camera feed, the real-time audio feed, the recorded video, the recorded audio, and other associated data streams based on the control instructions. It is appreciated that other types of processor arrangements could be implemented that provide for the capabilities disclosed herein.

Memory 320 may include a volatile or non-volatile, magnetic, semiconductor, tape, optical, removable, non-removable, or other type of storage device or tangible and/or non-transitory computer-readable medium that stores one or more executable programs 324, such as a meeting logging application 342 and an operating system 344. Programs 324 may also include communication software that, when executed by processor 310, provides communications using communication links 132 (referring to FIG. 1), such as Web browser software, tablet or smart handheld device networking software, etc.

Meeting logging application 342 may cause processor 310 to perform processes related to generating, transmitting, storing, receiving, indexing, and/or displaying audio and video in association with attendees and other users of a meeting. For example, meeting logging application 342 may be able to configure a client device to perform operations including: capturing a real-time (e.g., live) video stream, capturing a real-time (e.g., live) audio stream, displaying a graphical user interface (GUI) for receiving control instructions, receiving control instructions from the an attendee/user (e.g., via associated I/O devices and/or a virtual user interface—not shown), processing the control instructions, sending the real-time video and/or audio based on the control instructions, receiving real-time video and/or audio from other client device(s), and playing back selected streams of the video and audio in a manner customized by the attendee/user.

Operating system 344 may perform known functions when executed by processor 31. By way of example, operating system 40 may include Microsoft Windows™, Unix™ Linux™, Apple™ operating systems, Personal Digital Assistant (PDA) or mobile type operating systems such as Microsoft CE™, iOS™, and Android™, or another type of operating system.

Figure 4A:
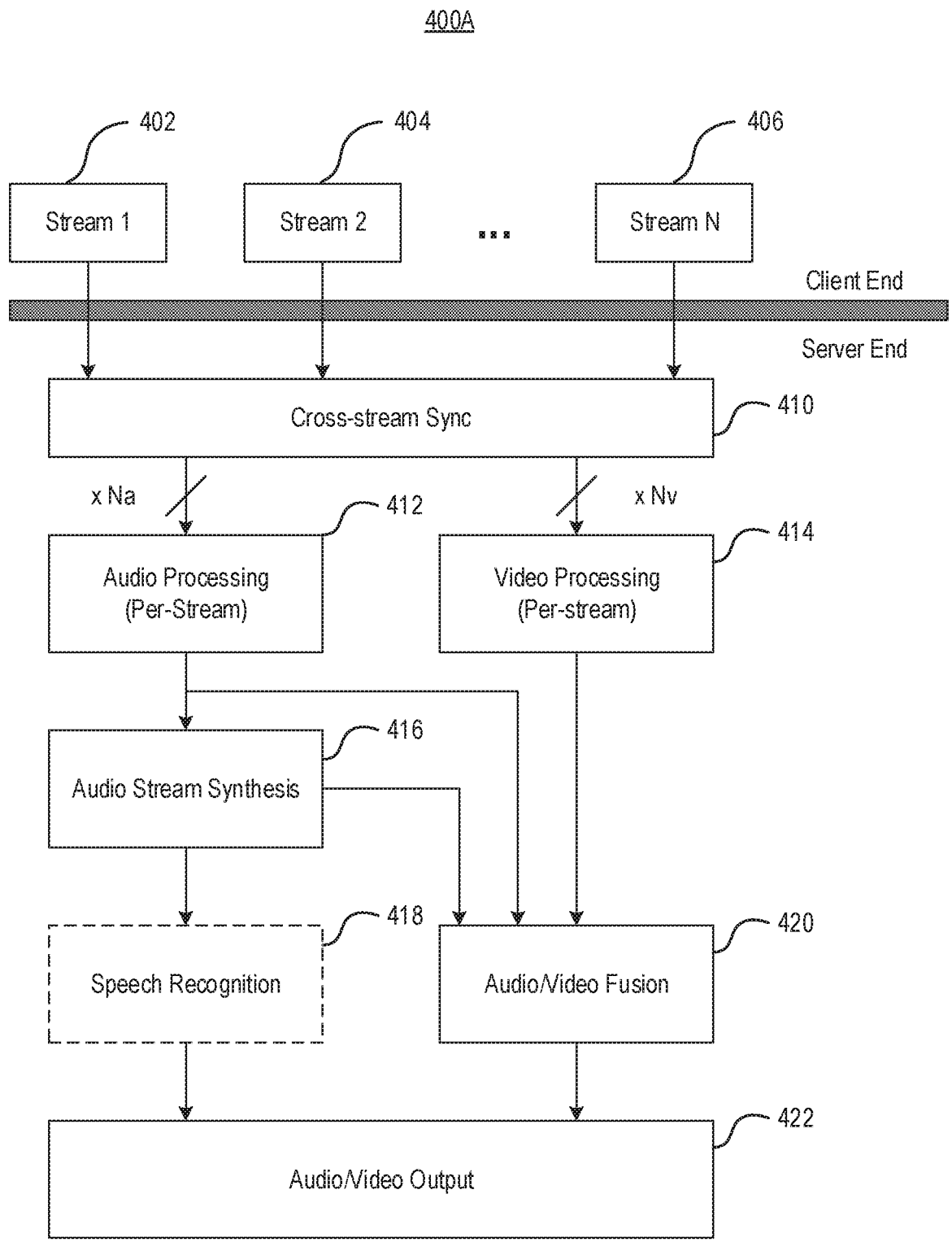
FIGS. 4A and 4B illustrate exemplary work flows for processing meeting information, according to embodiments of the disclosure.
Figure 4B:
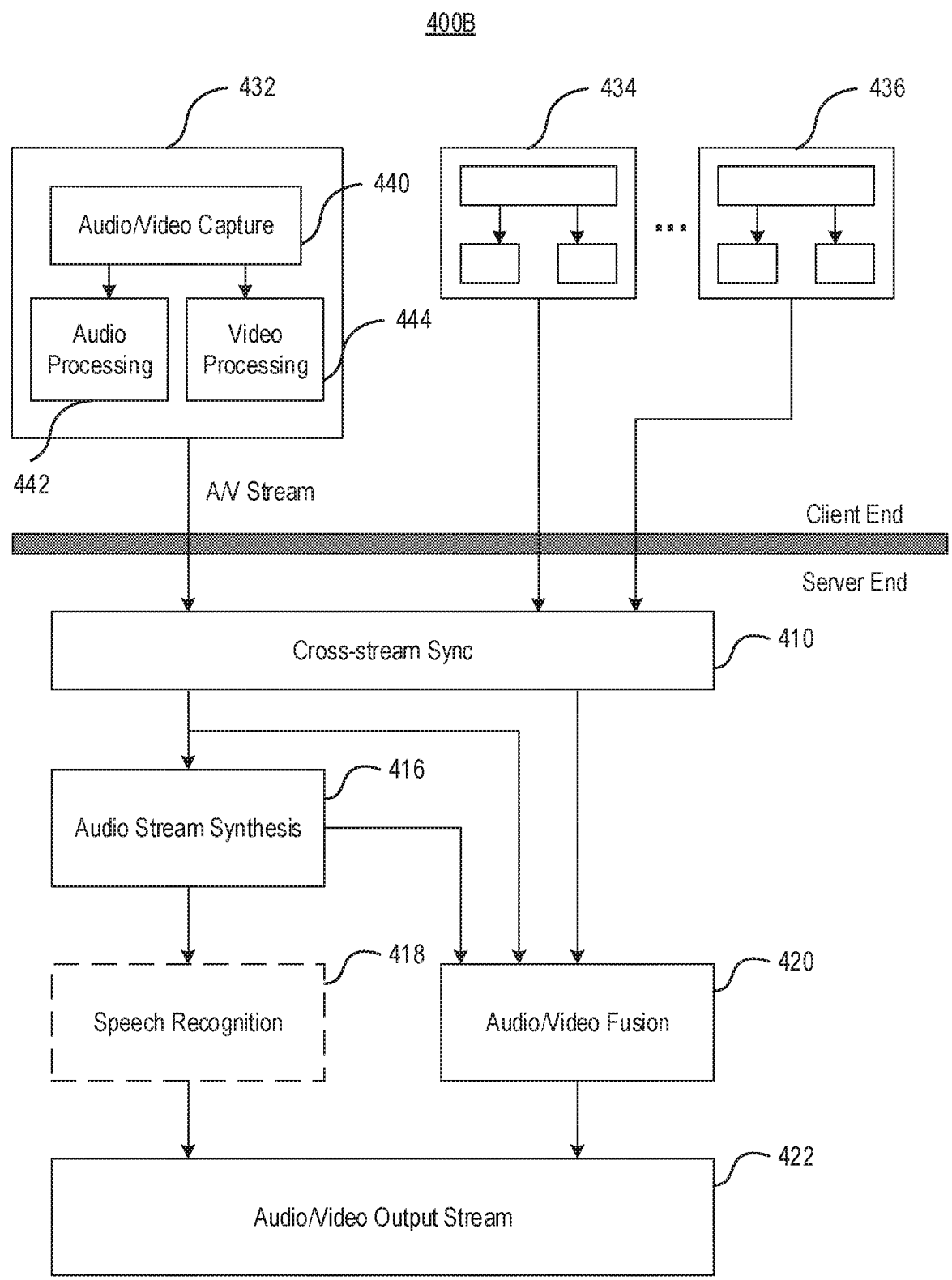

FIGS. 4A and 4B illustrate exemplary work flows for processing meeting information, consistent with embodiments of the disclosure. FIG. 4A shows an exemplary work flow 400A using client devices of a thin-client type (e.g., client devices having relatively weak computing power or battery-running devices), such as mobile phones or tablets/pads. FIG. 4B shows an exemplary work flow 400B using client devices of a thick-client type (e.g., client devices having relatively strong computing power or devices connected to external power sources), such as laptops or desktop computers. The distinction between a thin-client and thick-client device is not absolute, however, in that an individual client device may operate in either a thin-client mode or a thick-client mode, depending on circumstances. For example, a smart phone may be used as a thick-client, so long as it has enough battery power and computing capability to process the recorded media data. On the other hand, a laptop on battery may run as a thin-client. In some embodiments, the operating mode (thin- or thick-client) may be switched automatically depending on criteria such as available computing power and/or battery power. In some embodiments, switching between thin- or thick-client modes may also be performed manually by a user.

In some embodiment, multiple client devices in system 100 may include both thin- and thick-clients, and system 100 may therefore operate as a hybrid system, e.g., some clients running as thin-clients and others as thick-clients. The work flow of a hybrid system can be implemented as a combination of FIGS. 4A and 4B. For example, in the work flow shown in FIG. 4A, the client devices mainly perform audio/video recording and streaming the recorded media data to server 130, where most of the signal processing tasks take place. In the work flow shown in FIG. 4B, the client devices may include certain signal processing modules for performing signal processing task(s) locally at the client end. For instance, a thick-client type of client device can upload the captured audio/video stream as well as timestamped meta information resulting from local signal processing. Sever 130, after receiving a data stream from a client device, may determine if any signal process task has been performed by the client device and, if so, to what extent. Server 130 may then direct the data stream to forego any signal process module(s) on the server end that perform the same or substantially the same task(s) that have already been done by the client device. In this way, computing power of server 130 may be saved for processing those data streams received from thin-clients, resulting in faster processing speed, lower latency, or lower power consumption.

Referring to FIG. 4A, work flow 400A includes two parts: the first part performed by client devices (shown above the horizontal bar and denoted as operations conducted by the client end) and the second part performed by server 130 (shown below the horizontal bar and denoted as operations conducted by the server end). As discussed above, thin-client devices are mainly used to record a meeting (e.g., using camera 232 and/or microphone 234), generate data streams, and send the data streams to server 130. In some embodiments, system 100 may include multiple thin-client devices actively recording the meeting by capturing audio and/or video signals. For example, FIG. 4A shows multiple streams (e.g., streams 402, 404, and 406) that are sent to server 130 (e.g., via communication links 132) by multiple thin-client devices actively recording the meeting. The streams may include audio stream(s), video stream(s), and/or audio-video steam(s).

After receiving the streams, server 130 may process meeting information contained in the streams. As shown in FIG. 4A, server 130 may have several functional modules, including a cross-stream synchronization module 410, an audio processing module 412, a video processing module 414, an audio stream synthesis module 416, an optional automatic speech recognition (ASR) module 418, and an audio/video fusion module 420. These functional modules may be implemented using software, hardware, or a combination of software and hardware.

Cross-stream synchronization module 410 may be configured to synchronize the audio/video contents across the multiple streams such that the same event (e.g., an attendee's voice, action, etc.) captured by multiple client devices align with each other in time across the multiple streams. In practice, the audio/video streams received from different client devices may be out of sync. For example, different client devices may start recording the meeting at different times. The avoid the resulting offsets in starting time, cross-stream synchronization module 410 may obtain and compensate the relative offsets to a common clock (e.g., clock of server 130). In this way, the differences in starting time offsets can be avoided by resorting to a common clock time such as the Coordinated Universal Time (UTC).

Another cause for the out-of-sync issue is the difference in communication delays for different data streams to travel from their respective client devices to server 130. In fact, even for the same client device, communication delay may be variable at different time points depending on factors such as network conditions. To compensate for the communication delays, cross-stream synchronization module 410 may send (e.g., through communication interface 330) a series of k (e.g., k=5) probing packets to each client device and record the sending time ($Tss\_i$, i=1, 2, ... k) of each packet. Upon receiving a probing packet, a client device may immediately reply to server 130 with a response packet. Each response packet may include the client device's identification information and an instant timestamp, e.g., a UTC reading, indicating the response time. These response times may be denoted by $Tc\_ij$, where i=1, 2, ... k (probing packet index) and j=1, 2, ... N (client device index). For example, $Tc\_23$ means the $3^{rd}$ client device's response time to the $2^{nd}$ probing packet. After receiving a response packet to the $i^{th}$ probing packet from the $j^{th}$ client device (e.g., the identity of the client device sending the response packet can be determined based on the identification information contained in the response packet), server 130 may record the time of receiving the response packet as $Tsr\_ij$, where i=1, 2, ... k (probing packet index) and j=1, 2, ... N (client device index). For example, $Tsr\_45$ means the time of receiving the response packet sent by the $5^{th}$ client responding to the $4^{th}$ probing packet. Server 130 may then determine a round-trip-time (RTT) for the ith probing packet travels from server 130 to the $j^{th}$ client and back (in the form of a response packet) to server 130 by computing the time difference between $Tsr\_ij$ and $Tss\_i$ as $RTT\_ij = Tsr\_ij - Tss\_i$. An average of all k RTTs with respect to the $j^{th}$ client device can be calculated as $$RTTavg\_j = \frac{1}{k}\sum_{i=1}^{k} RTT\_ij.$$

The relative clock offset between a client device and server 130 can then be computed as the average of differences between the timestamp in a response packet and the corresponding sending time recorded by server 130, minus half of the average RTT, as follows:

$$offset\_j = \frac{1}{k}\sum_{i=1}^{k}(Tc_{ij} - Ts\_i) - \frac{1}{2}RTTavg\_j,$$

for the $j^{th}$ client device.

Using this method, the relative clock offset can achieve an accuracy of several tens to a few hundred of milliseconds. Higher accuracy synchronization can be achieved by resorting to signal-based synchronization, e.g., by examining the cross-correlation among streams, because the cross-correlation can be used as an indication of concurrency of a certain event. For example, if a sound signal is recorded by multiple microphones, a maximal correlation would appear between those audio streams at the moment when the sound signal arrived at each microphone.

It is noted that sound signal propagation delay may affect the accuracy of signal-based synchronization. A typical meeting room is usually a few meters in size. Therefore, sound propagation delay in such a room is usually within a few tens of milliseconds. To compensate for the sound propagation delay, techniques such as BeepBeep (a high-accuracy acoustic-based ranging method) can be used to measure the distances among client devices to account for the effect of sound propagation delay.

Cross-stream synchronization module 410, as well as other downstream modules, may process the streams in a piece-by-piece manner, where each piece is referred to as a frame. In some embodiments, an audio frame may be 30 milliseconds long, which constitute a basic processing unit. The size of the frame may also relate to the accuracy requirement for cross-stream synchronization. For example, it is undesirable to have too many out-of-sync frames. Therefore, cross-stream synchronization module 410 may first examine the standard deviation of RTTs resulting from sending probing packets and receiving response packets, as discussed above. If the standard deviation exceeds the desired synchronization accuracy (e.g., 30 ms), signal-based synchronization may follow, in which the peak of cross-correlation among streams is determined. After the peak is determined, cross-stream synchronization module 410 may synchronize the streams based on the peak (e.g., using the peak as an indication of concurrency).

However, identifying the peak of cross-correlation among streams can be computationally heavy and thus slow to compute. Several techniques can be used to speed it up. For example, cross-stream synchronization module 410 may perform computation using those frames with relatively high signal energy (e.g., higher than a predetermined threshold), after the energy of each frame is determined. In this way, frames having relatively low energy, indicating low voice or silence moments, may be omitted from the computation. In another example, cross-stream synchronization module 410 may first perform a rough search using certain statistical values of audio frames. For instance, cross-stream synchronization module 410 may use energy of each frame and/or the distances between neighboring signal frames to perform cross-correlation computation instead of using the actual signals. The peak cross-correlation among such statistical values of input streams may provide a rough estimate of the true peak of cross-correlation among actual signals. Based on the estimate, cross-stream synchronization module 410 may then apply cross-correlation search using actual signals around the estimated peak to identify the true peak with high accuracy.

After the streams are synchronized, synchronized audio streams may be input to audio processing module 412 and video streams may be input to video processing module 414. In some embodiments, modules 412 and 414 may operate on a per-stream basis. For example, audio processing module 412 may include Na processing channels to process Na audio streams, either in parallel or in series. Similarly, video processing module 414 may include Nv processing channels to process Nv video streams in parallel or in series.

In some embodiments, audio processing module 412 may apply one or more signal processing operations to incoming audio streams, including noise suppression, voice activity detection (VAD), automatic gain control (AGC), etc. These signal processing operations may be applied to each incoming audio frame, which may be 30 milliseconds long, as described above.

In some embodiments, VAD may be implemented by calculating certain features of quantities from an audio frame, and applying a classification rule to classify the audio frame as speech or non-speech (noise), based on, for example, comparing a value derived from the features or quantities with a threshold. For an audio frame, if the VAD result is positive (e.g., VAD==1), it can be treated as a signal frame; otherwise, the frame may be treated as a noise (or non-speech) frame. A signal frame and a noise frame may be treated differently. For example, as discussed above, energy of signal frames and their intervals (e.g., noise/non-speech frames between adjacent signal frames) can be used to perform rough estimation for cross-stream synchronization. In addition, a noise frame can be used to update a noise profile, which can be used in the calculation of signal-to-noise ratio, which will be discussed in greater detail below.

In some cases, one or more client devices may have already applied noise suppression and/or AGC to their audio stream(s). As a result, applying noise suppression to the streams from such devices may not provide much enhancement. To improve efficiency, audio processing module 412 may check the effect of noise suppression on a number of initial audio frames in an audio stream. If the effect is below a preset level, audio processing module 412 may skip the noise suppression operation for subsequent audio frames in that audio stream.

In some embodiments, audio processing module 412 may also be configured to perform voiceprinting operation. Voiceprinting is a technique for audio-based speaker identification. Audio processing module 412 may perform voiceprinting to detect speaker changes and/or to cluster speeches uttered by the same speaker. The clustered speeches may be matched with the identification of the speaker, which may be determined by recognizing the speaker from the video of the meeting recorded as video stream(s) (e.g., using face recognition). Detecting speaker changes may include checking, among consecutive signal frames, neighboring signal frames and determining whether the speaker changes, and dividing consecutive signal frames when the speaker has indeed changed. Voiceprinting operation may also be applied between signal frames before and after consecutive non-speech/noise frames unless the number of consecutive non-speech/noise frames is overly large (e.g., larger than a preset threshold). This is to splice signal frames that are separated by some non-speech frames, e.g., short silent moments during a speech. Speaker change detection and speech clustering may provide user friendly speech diarization, and may benefit subsequent automatic speech recognition.

Figure 5:
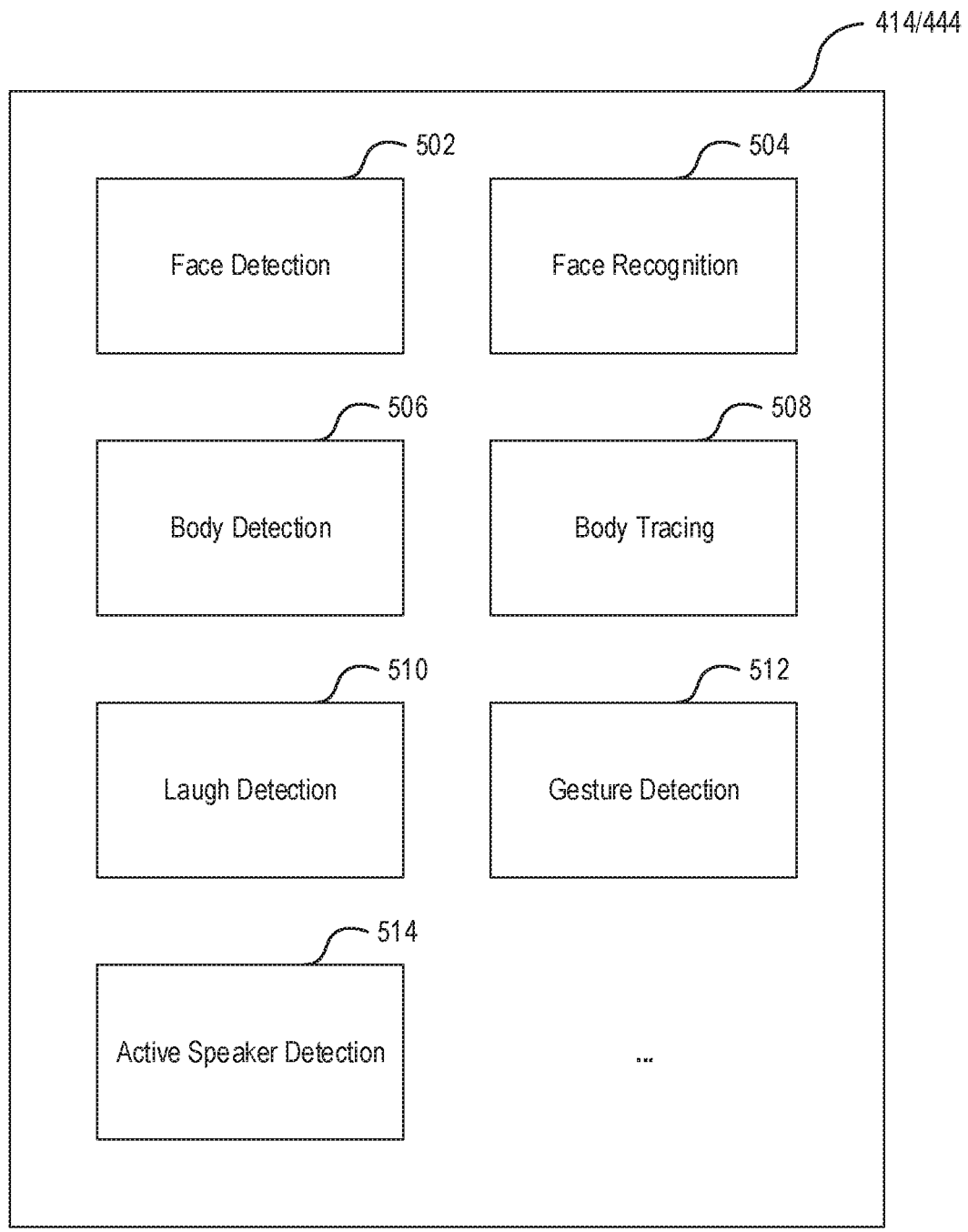
FIG. 5 is a block diagram of an exemplary video processing module, according to embodiments of the disclosure.

Video processing module 414 may be configured to provide a set of video signal processing functions that can be applied to extract various types of meta information from the video stream(s). The meta information can be used to annotate (e.g., tag) the final output data stream. In some embodiments, the meta information may be associated with the timestamp(s) of corresponding video frame(s). In some embodiments, one or more video signal processing functions can be provided as optional plug-in(s). FIG. 5 illustrates an exemplary feature set provided by video processing module 414 (also applicable to video processing module 444 shown in FIG. 4B). As shown in FIG. 5, video processing module 414/444 may provide a face detection function 502. For example, a deep neural network may be implemented for face detection. Video processing module 414/444 may provide a face recognition function 504. For example, face recognition can be achieved by making Application Programming Interface (API) calls to one or more service provides providing face recognition services. Video processing module 414/444 may provide a gesture detection function 512. For example, certain gestures can be detected and used to signal certain purpose, e.g., adding a highlight tag based on a detection of a nodding of head. Video processing module 414/444 may provide an active speaker detection function 514. For example, active speaker detection may be implemented using a deep neural network based on SqueezeNet architecture, in which neighboring frames are used in a sliding window. Video processing module 414/444 may also provide a body detection function 506, a body tracing function 508, and a laugh detection function 510. These functions can be implemented by accessing one or more online services providing the corresponding functions.

In some embodiments, the function(s) or feature(s) provided by video processing module 414/444 may not necessarily be applied to every incoming stream, and can be turned ON/OFF by a user (e.g., through I/O devices 230 shown in FIG. 2).

Returning to FIG. 4A, after audio streams are processed by audio processing module 412, the processed audio streams are input to audio stream synthesis module 416. In some embodiments, audio stream synthesis module 416, together with other modules, may implement an SNR-based algorithm to select, from multiple audio streams, an audio steam having the highest SNR as a candidate stream for outputting to downstream modules.

When multiple people attend a meeting with a plurality of client devices, it is natural and probable that a person is closer to some devices than to other devices. In general, for microphones on typical client devices that are designed to make short-range recordings, a shorter distance may imply higher signal quality. Therefore, compared to the case of recording a meeting with any single client device, there exist good chances that a high-quality audio stream can be composed by selecting the best moments or recording segments from all the client devices participating in recording the meeting. In addition, to provide good hearing experience, an abrupt change of source streams during the middle of a sentence uttered by the same speaker should be avoid. Therefore, switching of source streams is generally not allowed during moments of consecutive signal frames, except that these consecutive signal frames contain audio signals from two different speakers. It is relatively less noticeable to change source streams when an attendee makes a relatively long pause.

Moreover, given the possible differences in device capability, devices placed at similar distances from a speaker do not necessarily yield recordings of similar qualities. Therefore, although distance generally relates to quality, it is not always accurate to select source streams based on distance. A more accurate and direct measure of recording quality is the SNR of the recording signals. Based on the above observations, an SNR-based audio stream synthesis algorithm can be implemented. The flowchart of an exemplary algorithm 600 is depicted in FIG. 6.

Figure 6:
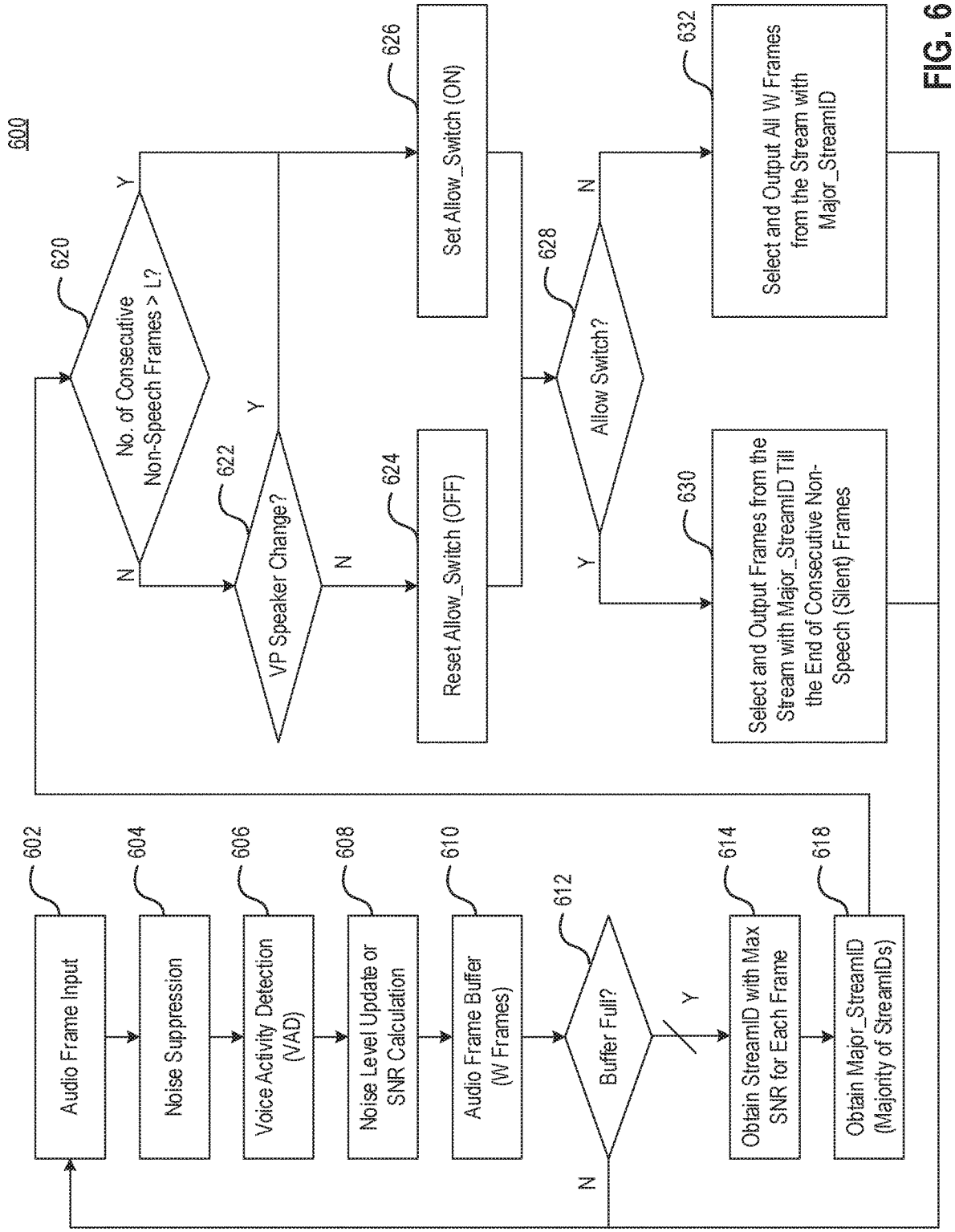
FIG. 6 is a flowchart of an exemplary process for selecting audio data from multiple audio inputs, according to embodiments of the disclosure.

Referring to FIG. 6, method 600 starts with step 602, in which audio frames from multiple audio streams are input for processing. For example, multiple client devices may continuously record audio signals in a meeting using their microphones (e.g., microphone 234 in FIG. 2). The audio recording may be performed continuously at a certain sampling rate (e.g., 16 kHz). Each client device may then pack the audio recording samples into an audio frame at a predetermined rate, for example, every 30 milliseconds. The audio frames may then be input to server 130 in step 602, and synchronized across the multiple steams by cross-stream synchronization module 410, as discussed above. For each audio frame, noise suppression can be optionally applied in step 604, for example by auto processing module 412, as discussed above. In step 606, voice activity detection (VAD) may be performed to detect whether an audio frame is a signal frame or a noise frame (also referred to as a non-speech frame or a silent frame). VAD may also be performed by audio processing module 412, as discussed above.

In step 608, audio stream synthesis module 416 may calculate the SNR for each audio frame or update the noise level. For example, for an audio frame $X(t)=\{x_1, x_2, \ldots, x_k\}$, if it's a signal frame (vad==1), audio stream synthesis module 416 may calculate the energy of the frame s(t), and obtain the SNR by take a 10 log 10 ratio between the energy of the signal and noise level $\hat{n}(t)$. For a noise (non-speech) frame (vad==0), its energy may also be calculated as n(t). The noise energy n(t) can then be used to update the noise level $\hat{n}(t)$. The equations for calculating the SNR and noise level are as follows:

$$n(t) = \sum x_i^2(t), \hat{n}(t) = 0.99 \cdot \hat{n}(t-1) + 0.01 \cdot n(t); \text{ if } vad == 0$$

-continued $$\hat{n}(t) = \hat{n}(t-1), s(t) = \sum x_i^2(t), snr = 10\log_{10}\left(\frac{s(t)}{\hat{n}(t)}\right); \text{ if } vad == 1$$

For a noise (non-speech) frame (VAD==0), its SNR can be set to −40. In addition, in the above equations, a weighing factor of 0.99 is used to calculate a moving average of noise level, where the weighting factor of 0.99 favors old or existing noise level. Other weighting factors can also be applied. For example, a weighting factor of less than 0.5 favors the new noise data in the moving average calculation.

In step 610, the audio frame of each stream whose SNR value has been determined in step 608 may be buffered. In some embodiment, W audio frames may be buffered before making a stream selection decision, where W is a predetermined number. In one implementation, W=16, which indicates a decision delay of 480 milliseconds (each frame is 30 milliseconds long).

In step 612, audio stream synthesis module 416 may determine whether the buffer is full. If not, the process of method 600 returns to step 602 to process the next audio frame. If W audio frames are buffered for each of the multiple input streams, then the process of method 600 proceeds to step 614, in which audio stream synthesis module 416 may compare the SNR values of corresponding audio frames across the multiple audio streams. The corresponding audio frames refer to the audio frames captured by the multiple client devices that record the same concurrent event. Based on the comparison, audio stream synthesis module 416 may identify a winning audio stream, for example, by identifying its StreamID, whose SNR value is higher than other audio streams for the individual audio frames under comparison. For the W buffered frames, where the comparison of SNR values is performed for each frame across the multiple audio streams, the number of times an audio stream being identified as a wining audio stream may be used as an SNR indicator to indicate an average SNR of that audio stream. The more times an audio stream is identified as a winning stream, the higher the average SNR over the W frames. In step 618, audio stream synthesis module 416 may obtain the StreamID of the audio stream which has been identified as a winning stream the most times (e.g., in the majority of the identified winning StreamIDs), corresponding to an SNR indicator that is higher than all other audio streams. The stream corresponding to the majority of the StreamIDs may be selected as a candidate audio stream for output.

In the comparison of SNR values in step 614, if the max SNR is −40, indicating that all the frames are non-speech frames, then the winning stream can be set as a special stream ID (e.g., −1). Such case usually corresponds to an all-silence moment.

The following simplified example illustrates the process of determining wining stream IDs and obtaining the stream ID that wins the most times. Assume that there are four audio streams A, B, C, and D, each including a series of audio frames A=[A1, A2, A3, . . . ], B=[B1, B2, B3, . . . ], C=[C1, C2, C3, . . . ], and D=[D1, D2, D3, . . . ]. After all four streams fill their respective buffers full, the audio frames within the buffers are: A=[A1, A2, A3, . . . , AW], B=[B1, B2, B3, . . . , BW], C=[C1, C2, C3, . . . , CW], and D=[D1, D2, D3, . . . , DW]. Then in step 614, the SNR values of A1, B1, C1, and D1, which are corresponding frames across the four streams, are compared. Assume that the SNR value for these four frames are −40, 5, 10, and 12, then stream D will be identified as the winning stream because frame D1 has the highest SNR. Similarly, for each subsequent frame in each stream, the SNR of that frame is compared across all streams, and the winning stream is identified. Assume that, for the W frames in each buffered stream, the winning stream ID sequence is [S1, S2, . . . , SW], where Si is one of A, B, C, and D. Then in step 618, audio stream synthesis module 416 may determine which stream ID is the majority in the winning stream ID sequence (e.g., by counting the number As, Bs, Cs, and Ds and determining which appears the most times), and select the stream corresponding to that majority stream ID as the candidate stream.

It is noted that prior to the step 614, the processing flow is applied to all of the input streams, even though only one input stream is illustrated in FIG. 6 for sake of clarity. In some embodiments, all the input audio frames are processed synchronously and in parallel across all the input streams. In step 614, audio stream synthesis module 416 may take as input information (e.g., SNR values, VAD result, etc.) from all the input streams. In step 618, audio stream synthesis module 416 may determine a candidate audio stream as part of the output data stream (e.g., by identifying its streamID). Subsequent processing after step 618 is applied to this specific candidate stream.

In steps 620-632, audio stream synthesis module 416 may determine if the W frames of the candidate audio stream should be output as a whole or partially. This may be controlled by an "Allow_Switch" flag. In some embodiments, the Allow_Switch flag may be initialized to False, indicating that the entire W frames are to be output. To set or reset this flag, audio stream synthesis module 416 may first examine if there exist long (e.g., more than L=10) consecutive non-speech (e.g., stream ID equals to -1) frames, in step 620. If yes (Y branch of step 620), the process proceeds to step 626, in which the Allow_Switch flag is set to True or ON, indicating that switching of candidate stream is allowed. Otherwise (N branch of step 620), the process proceeds to step 622, in which audio stream synthesis module 416 further examine the voiceprinting output (e.g., performed by audio processing module 412) as to whether there is speaker change. Note that in this case, voiceprinting may be performed between neighboring signal frames, and non-speech frames can be skipped in computing the voiceprinting similarity. If the voiceprinting result indicates no speaker change (N branch of step 622), then the process proceeds to step 624, in which the Allow_Switch flag is reset (i.e., set to False or OFF). If, however, the voiceprinting result indicates speaker change (Y branch of step 622), then the process proceeds to step 626, in which audio stream synthesis module 416 may set the Allow_Switch flat to True or ON.

In step 628, audio stream synthesis module 416 may check the Allow_Switch flag. If the Allow_Switch flag is set (ON), then audio stream synthesis module 416 may output frames from the candidate stream from the beginning of the W-frame buffer till the end of the consecutive silent frames, in step 630. If the Allow_Switch flag is reset (OFF), audio stream synthesis module 416 may output all of the W frames from the candidate stream, in step 632.

In the special case where the candidate (majority) output stream ID is -1 (indicating an all silence moment), audio stream synthesis module 416 may determine if there are signal frames at the end of the W-frame buffer. If yes, audio stream synthesis module 416 may retain those signal frames, and output the frames before the retained signal frames without changing the output stream ID. That is, audio stream synthesis module 416 may retain the previous output stream ID. As discussed above, all the input streams are processed synchronously. Thus, when a number of frames are output from the selected stream, all the input stream buffers will advance by the same number of frames.

Returning to FIG. 4A, the candidate audio stream selected by audio stream synthesis module 416 may be input to an optional automatic speech recognition module 418. Speech recognition module 418 may include a known algorithm to transcribe the speeches contained in the candidate stream. The transcription may be output to audio/video output module 422, as a separate information channel or integrated with the audio/video data.

The candidate audio stream may also be input to audio/video fusion module 420 to generate a combine audio-video data stream together with the video streams output from video processing module 414. One objective of system 100 is to record the audio and video of active speakers throughout the meeting. Because system 100 is designed to operate with a high degree of flexibility, which allows aggregation of meeting information obtained from a wide range of client devices, e.g., some may only capture audio and some may capture video, audio and video information are mainly processed separately prior to audio/video fusion module 420. To compose the final audio/video stream, audio/video fusion module is configured to combine audio and video data using an algorithm based on the diarization result of audio stream while taking into account the intermediate video-based active speaker detection results of the input video streams. The algorithm is based on the co-occurrence of the moments of speaking/non-speaking transitions for the same speaker and change of speakers among audio streams and video streams. An active speaker can be identified using cross-correlation between moments-vectors, assuming in meetings, most of the time only one person speaks. In case that a speaker is never captured by any camera, his/her video may be absent. His/her video may be replaced with other video from other sources, either randomly or following certain rules. As an example, if a whiteboard or projector screen is captured, video of the whiteboard or project screen may be used to fill in the absence of the active speaker's video.

Figure 7:
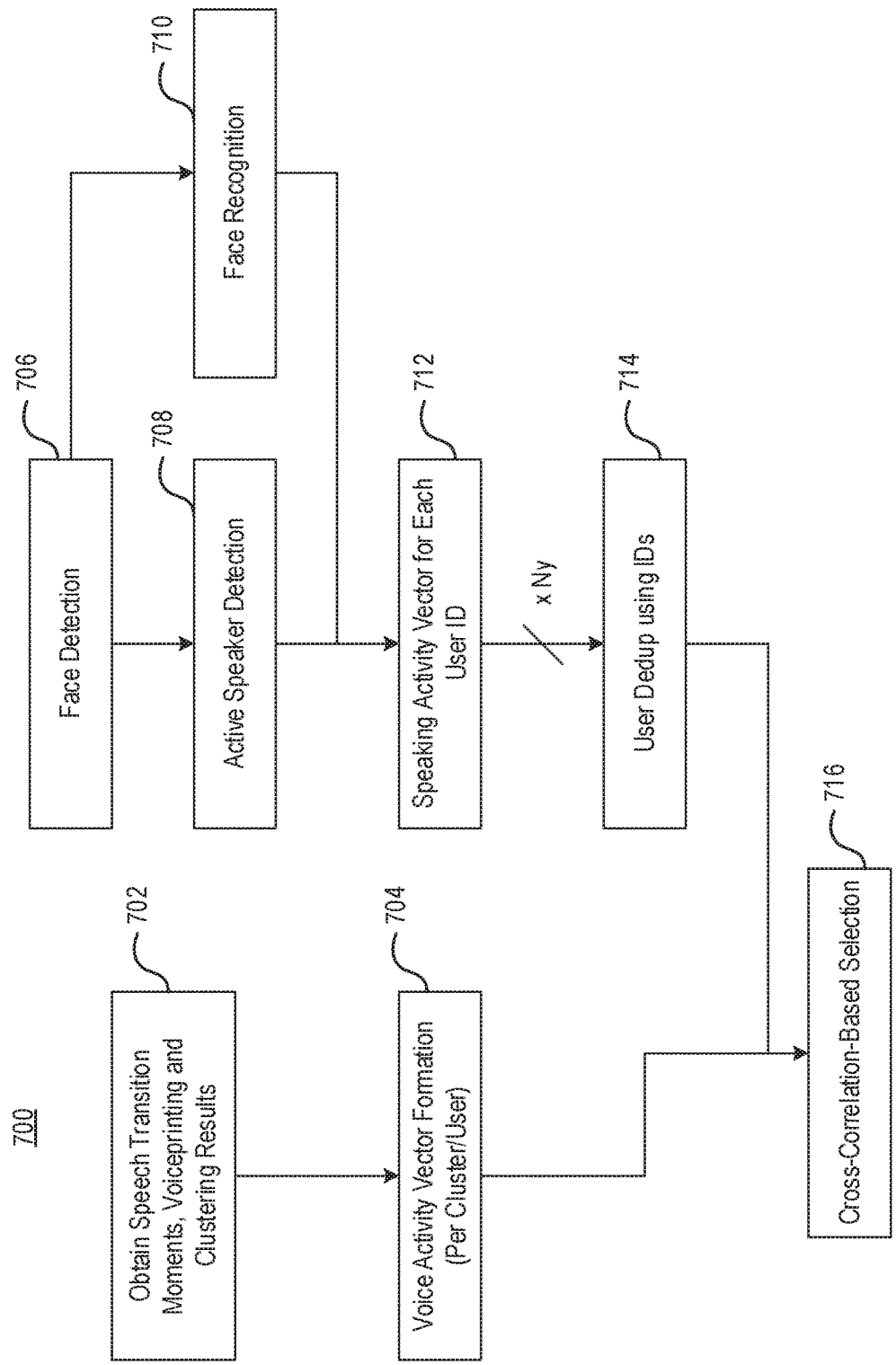
FIG. 7 is a flowchart of an exemplary process for combining audio and video data, according to embodiments of the disclosure.

FIG. 7 is a flowchart of an exemplary method 700 for combining audio and video data. Method 700 may be practiced by audio/video fusion module 420 along with other components of system 100. Referring to FIG. 7, method 700 starts from step 702, in which speech and non-speech transition moments, speaker change moments (from voiceprinting and clustering results) in the unit of audio frames may be obtained from the audio stream synthesis pipeline (e.g., method 600). In step 704, a voice activity vector can be formed for each cluster, which also corresponds to one speaker. For example, a vector element may take an value "1" if the speaker is actively talking, and "0" otherwise. That is, a "0" element of one speaker indicates that either some other speaker(s) are speaking or all speakers are silent at the moment that element corresponding to. In another example, a ternary vector for each cluster may be formed, in which a vector element may take values "1," "0," and "4," corresponding to the user is speaking, all speakers are silence, and some other speaker(s) are speaking, respectively. Because the processing in step 703 is with respect to audio streams, the term "speaking" used herein means audially speaking.

Similarly, for each input video stream (e.g., assuming there are Nv video streams), face detection may be performed in step 706. Face detection may be performed by audio/video fusion module 420 or video processing module 414 (e.g., using module 502). In some embodiments, face tracking is performed once a face is detected for higher computational efficiency. When a face is detected, face recognition may be performed in step 710 to obtain the attendee's identification information. Again, face recognition may be performed by audio/video fusion module 420 or video processing module 414 (e.g., using module 504). In the meantime, the video may be processed by active speaker detection module 514 to identify the moments that an attendee starts and stops speaking and remains silence, in step 708. With these speaking status transition moments based on video-based processing, a speaking activity vector for each user ID may be formed in step 712, indicating whether the speaker visually speaks at different moments. Similar to the audio case, the speaking activity vector may be formed using "1" for active speaking and "0" for otherwise, or as a ternary vector with "1," "0," and "−1" for active speaking, non-speaking, and other's speaking. The independent detection results from all the video streams further undergo a deduplication process in step 714 to handle the case that a user is captured by multiple cameras. For example, the face recognition results may be used in the deduplication process. In another example, deduplication may be performed by directly comparing the detected faces.

It is noted that both audio and video signal processing are performed on a frame-by-frame basis, and the time duration of an audio frame is, for example, 30 milliseconds, while that of a video frame is usually around 33 milliseconds (assuming 30 fps input). Therefore, audio frames and video frames can rarely align. To compensate for this misalignment, a finer unit, for example, 10 milliseconds, can be used when forming the moment vectors. As a result, an active audio frame may yield three "1"s in the vector. For video frames, a round operation can be applied when determining the state of a vector element. For example, starting from the beginning, one active video frame may yield three "1"s, two consecutive active video frames may yield seven "1"s, whereas one active and one inactive video frame may yield three "1"s and four '0's, and one inactive video frame and one active frame may yield three "0"s and four "1"s. Breaking into finer unit may yield more precise transition moments and lead to more robust computation of cross-correlation among moment vectors from audio and video streams.

In step 716, the cross-correlation among all the moment vectors of all unrecognized audio clusters and those from all unmatched user identified from video streams may be calculated. These moment vectors may all have the same time-span (as all the audio/video streams are already synchronized). To increase the robustness, relatively longer moment vectors can be accumulated and retained, for example, with a 5-second span. Based on the cross-correlation, the user from the video matching the speaker in the audio stream can be selected such that the cross-correlation between the user's voice activity vector (audio-based) and speaking activity vector (video-based) is the maximum.

Now referring to FIG. 4B, which shows a work flow 400B using thick-client type of devices 432, 434, and 436. The difference between work flows 400A and 400B is that the audio and video processing modules are implemented on the client end in work flow 400B, thanks to the stronger computational power provided by the thick-client devices. For example, client device 432 may include an audio/video capture module 440, which may include camera 232 and/or mic 234. In addition, client device 432 may also include audio processing module 442 and/or video processing module 444. Audio processing module 442 is similar in function to audio processing module 412, with a minor difference that audio processing module 442 may include a single processing channel to process the audio stream captured by audio/video capture module 440, whereas audio processing module 412 may include multiple processing channels operating in parallel to process multiple audio streams. Similarly, video processing module 444 is functionally similar to video processing module 414, and may only have single-channel processing capability, compared to the multiple-channel counterpart 414. Other components shown in work flow 400B are the same as those in work flow 400A.

In this disclosure, the modules are described from their functionality aspect, and are not limited to specific algorithms. For example, different algorithms (e.g., with different computational complexities) achieving the same or substantially the same functionalities (e.g., with possible differences in computational resource requirement, running time, accuracy, etc.) may be used In addition, a video-based processing module (e.g., 414, 444) may be a composite module, in which multiple sub-modules can be optionally executed (e.g., FIG. 5). The more such sub-modules are applied, the more meta information (such as users' IDs, users' face expressions, active speaker, etc.) can be obtained. These meta information may be used to annotate the final composed audio/video stream as well as the transcripts, and can be leveraged to better organize the meeting log and provide tags for more efficient meeting log review.

The present disclosure provides systems and methods for more effective meeting logging, which includes features that facilitates pre-meeting preparations, in-meeting manual notes taking, and post-meeting follow-ups. In particular, system 100 may include a distributed collaborative software system, which may feature a client mobile application installed on a client device. The mobile application may obtain meeting events from user's calendar. Each user can upload meeting materials to the mobile application, which may be automatically synced to other client devices. In the mobile application, there may be provided with a common, public editing field and a private editing field. Any edits in the public field may be immediately seen by other meeting participants whereas notes in the private section may be only visible to the user him/herself. Therefore, the public editing field can be used as a collaborative authoring area. For example, meeting attendees may put together a meeting agenda or background materials by attach the information to the public area.

System 100 may also provide a note-taking function. For example, the notes taken during a meeting, either public or private, may be automatically timestamped. Other meeting events (e.g., identity of the note taker, a special tagging gesture, etc.) that are detected by video processing module 414/444 may also be timestamped. As discussed above, automatic speech recognition may be performed to the synthesized audio streams (e.g., using speech recognition module 418). From the speech recognition results, each sentence may also be timestamped. The timestamped information (e.g., tags, transcriptions, etc.) may be associated to the final fused audio/video stream and the transcript, through the timestamps. This allows efficient post-meeting review of meeting logs. For example, the reviewer may jump among various tags when reviewing to quickly locate the content of interest.

To facilitate easy sharing of meeting notes, a reverse-editing mechanism is provided that allows users to achieve audio/video editing through the manipulation of transcripts. For instance, a user may wish to generate his/her excerpts (or highlights) of the meeting. The user can do so simply by browsing and selecting interested portions of the scripts, and system 100 can automatically identify and collect the corresponding audio/video contents and package them into one collection. In some embodiments, system 100 may automatically seek the corresponding audio/video contents as the user is browsing the scripts. The user may shuffle the selections, which may lead to the shuffling to corresponding audio/video contents as well. The user may export the collection into a single audio/video file and share it with ease.

The disclosed systems and methods may improve recording quality associated with logging meeting content. For example, audio streams having high SNRs can be selected from multiple audio streams to enhance the audio quality of the recorded meeting logs. In addition, combined audio and video stream with tag information may facilitate more convenient sharing and reviewing of meeting content among users, as well as greater consumption of the content at a higher level.

Another aspect of the disclosure is directed to a non-transitory computer-readable medium that stores instructions, which, when executed, cause one or more of the disclosed processors (e.g., processor 310 of server 130) to perform the methods discussed above. The computer-readable medium may include volatile or non-volatile, magnetic, semiconductor, tape, optical, removable, non-removable, or other types of computer-readable medium or computer-readable storage devices. For example, the computer-readable medium may be memory 320 and the computer instructions stored thereon may include programs 324 (e.g., meeting logging application 342, operating system 344, etc.) and/or data 326.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for processing information of a meeting, comprising:
   a communication interface configured to receive meeting information obtained by a plurality of client devices, wherein the meeting information comprises multiple audio streams, wherein the audio streams comprise a plurality of audio frames;
   a memory storing computer-executable instructions; and
   a processor in communication with the communication interface and the memory, the processor being configured to execute the computer-executable instructions to perform operations, wherein the operations comprise:
      determining signal-to-noise-ratio (SNR) indicators associated with the audio streams;
      selecting, from the audio streams, a candidate audio stream based on the SNR indicators, wherein the SNR indicator associated with the candidate audio stream indicates that the candidate audio stream has a higher average SNR than that of a predetermined number of other audio streams;
      generating an output data stream including at least a portion of the candidate audio stream; and
      determining, for each audio stream, SNR values of a predetermine number of audio frames;
      comparing the SNR values of corresponding audio frames across the multiple audio frames;
      identifying, based on the comparison, a winning audio stream for an individual audio frame, wherein the winning audio stream has a higher SNR value than other audio streams for that individual audio frame; and
      determining the SNR indicators based on a number of times an audio stream being identified as a winning audio stream over the predetermined number of comparisons conducted corresponding to the predetermined number of audio frames.

2. The system of claim 1, wherein:
   the SNR indicator associated with the candidate audio stream indicates that the candidate audio stream is identified as a winning audio stream more than any other audio streams.

3. The system of claim 1, wherein the operations comprise:
   determining, for one of the predetermined number of audio frames, whether the audio frame contains voice signals; and
   in response to the determination that the audio frame does not contain voice signals:
      setting the SNR value of the audio frame to a preset value;
      calculating noise energy of the audio frame; and
      updating a noise level based on the noise energy.

4. The system of claim 1, wherein the operations comprise:
   determining, for one of the predetermined number of audio frames, whether the audio frame contains voice signals; and
   in response to the determination that the audio frame contains voice signals:
      calculating signal energy of the audio frame; and
      determining the SNR value of the audio frame based on the signal energy and a noise level.

5. The system of claim 1, wherein the operations comprise:
   determining, for the candidate audio stream, whether the predetermined number of audio frames include an indication of a speaker change, a speaker being an attendee of the meeting; and
   in response to the determination that the predetermined number of audio frames include an indication of a speaker change, selecting, within the candidate audio stream, a portion of the predetermined number of audio frames to be included in the output data stream, the portion corresponding to voice of a same speaker.

6. The system of claim 1, wherein the operations comprise:
   providing a transcript of the output data stream, the transcript matching at least part of the candidate audio stream in the output data stream;
   receiving a request for selecting at least a portion of the transcript;
   identifying, based on the request, contents in the output data stream corresponding to the selected portion of the transcript; and
   packaging the identified contents into a collection.

7. The system of claim 1, wherein the operations comprise:
   synchronizing audio streams based on a common clock time.

8. The system of claim 1, wherein the operations comprise:

sending, through the communication interface, probing packets to the client devices;
receiving, from the client devices, responses to the probing packets, the responses including response times recorded by the client devices upon receiving the probing packets;
determining round-trip-times (RTTs) indicating time differences between sending the probing packets and receiving the response packets;
determining relative clock offsets for the audio streams based on the RTTs and the response times; and
synchronizing audio streams based on the relative clock offsets.

9. The system of claim 1, wherein the operations comprise:
determining cross-correlation values among audio streams; and
synchronizing the audio streams based on a peak of the cross-correlation values.

10. The system of claim 1, wherein:
the meeting information comprises video streams; and
the operations comprise:
determining that a speaker audially speaks in at least a portion of the candidate audio stream;
detecting an attendee of the meeting visually speaking based on face detection from the video streams;
associating a video of the attendee visually speaking with the portion of the candidate audio stream in which the speaker audially speaks; and
generating the output data stream including at least the portion of the candidate audio stream and the associated video of the speaker.

11. The system of claim 10, wherein associating a video of the attendee visually speaking with the portion of the candidate audio stream in which the speaker audially speaks comprise:
determining a voice activity indicator for the speaker based on the candidate audio stream, the voice activity indicator indicating whether the speaker audially speaks at a first set of predetermined moments;
determining speaking activity indicators for multiple attendees of the meeting based on the video streams, the speaking activity indicator corresponding to an attendee indicating whether the attendee visually speaks at a second set of predetermined moments;
determining cross-correlations between the voice activity indicator and the speaking activity indicators;
selecting an attendee to whom the corresponding speaking activity indicator has a highest cross-correlation with the voice activity indicator to associate with the speaker.

12. A method for processing information of a meeting, comprising:
receiving, by a communication interface, meeting information obtained by a plurality of client devices, wherein the meeting information comprises multiple audio streams, wherein the audio streams comprise a plurality of audio frames;
determining signal-to-noise-ratio (SNR) indicators associated with the audio streams;
selecting, from the audio streams, a candidate audio stream based on the SNR indicators, wherein the SNR indicator associated with the candidate audio stream indicates that the candidate audio stream has a higher average SNR than that of a predetermined number of other audio streams;
generating an output data stream including at least a portion of the candidate audio stream;
determining, for each audio stream, SNR values of a predetermine number of audio frames;
comparing the SNR values of corresponding audio frames across the multiple audio frames;
identifying, based on the comparison, a winning audio stream for an individual audio frame, wherein the winning audio stream has a higher SNR value than other audio streams for that individual audio frame; and
determining the SNR indicators based on a number of times an audio stream being identified as a winning audio stream over the predetermined number of comparisons conducted corresponding to the predetermined number of audio frames.

13. The method of claim 12, wherein:
the SNR indicator associated with the candidate audio stream indicates that the candidate audio stream is identified as a winning audio stream more than any other audio streams.

14. The method of claim 12, comprises:
determining, for one of the predetermined number of audio frames, whether the audio frame contains voice signals;
in response to the determination that the audio frame does not contain voice signals:
setting the SNR value of the audio frame to a preset value;
calculating noise energy of the audio frame; and
updating a noise level based on the noise energy; and
in response to the determination that the audio frame contains voice signals:
calculating signal energy of the audio frame; and
determining the SNR value of the audio frame based on the signal energy and the noise level.

15. The method of claim 12, comprises:
providing a transcript of the output data stream, the transcript matching at least part of the candidate audio stream in the output data stream;
receiving a request for selecting at least a portion of the transcript;
identifying, based on the request, contents in the output data stream corresponding to the selected portion of the transcript; and
packaging the identified contents into a collection.

16. The method of claim 12, comprising:
sending, through the communication interface, probing packets to the client devices;
receiving, from the client devices, responses to the probing packets, the responses including response times recorded by the client devices upon receiving the probing packets;
determining round-trip-times (RTTs) indicating time differences between sending the probing packets and receiving the response packets;
determining relative clock offsets for the audio streams based on the RTTs and the response times; and
synchronizing audio streams based on the relative clock offsets.

17. The method of claim 12, wherein:
the meeting information comprises video streams; and
the method comprises:
determining that a speaker audially speaks in at least a portion of the candidate audio stream;
detecting an attendee of the meeting visually speaking based on face detection from the video streams;

associating a video of the attendee visually speaking with the portion of the candidate audio stream in which the speaker audially speaks; and generating the output data stream including at least the portion of the candidate audio stream and the associated video of the speaker.

18. A non-transitory computer-readable medium storing instructions that are executable by at least one processor to cause performance of a method for processing information of a meeting, the method comprising:

receiving meeting information obtained by a plurality of client devices, wherein the meeting information comprises multiple audio streams, wherein the audio streams comprise a plurality of audio frames;

determining signal-to-noise-ratio (SNR) indicators associated with the audio streams;

selecting, from the audio streams, a candidate audio stream based on the SNR indicators, wherein the SNR indicator associated with the candidate audio stream indicates that the candidate audio stream has a higher average SNR than a predetermined number of other audio streams;

generating an output data stream including at least a portion of the candidate audio stream;

determining, for each audio stream, SNR values of a predetermine number of audio frames;

comparing the SNR values of corresponding audio frames across the multiple audio frames;

identifying, based on the comparison, a winning audio stream for an individual audio frame, wherein the winning audio stream has a higher SNR value than other audio streams for that individual audio frame; and determining the SNR indicators based on a number of times an audio stream being identified as a winning audio stream over the predetermined number of comparisons conducted corresponding to the predetermined number of audio frames.

* * * * *